United States Patent
Matsui et al.

(10) Patent No.: US 9,757,811 B2
(45) Date of Patent: Sep. 12, 2017

(54) METHOD FOR TREATING SURFACE OF ALUMINUM HEAT EXCHANGER

(71) Applicant: Nippon Paint Surf Chemicals Co., Ltd., Tokyo (JP)

(72) Inventors: Norizumi Matsui, Tokyo (JP); Yuko Wada, Tokyo (JP); Akihiro Mizuno, Tokyo (JP); Junsuke Hokka, Tokyo (JP)

(73) Assignee: Nippon Paint Surf Chemicals Co., Ltd., Tokyo (JP)

( * ) Notice: Subject to any disclaimer, the term of this patent is extended or adjusted under 35 U.S.C. 154(b) by 290 days.

(21) Appl. No.: 14/346,132

(22) PCT Filed: Sep. 20, 2012

(86) PCT No.: PCT/JP2012/074059
§ 371 (c)(1),
(2) Date: Mar. 20, 2014

(87) PCT Pub. No.: WO2013/042725
PCT Pub. Date: Mar. 28, 2013

(65) Prior Publication Data
US 2014/0223740 A1    Aug. 14, 2014

(30) Foreign Application Priority Data
Sep. 21, 2011  (JP) ................. 2011-205809

(51) Int. Cl.
| | |
|---|---|
| C23C 22/34 | (2006.01) |
| C23C 22/40 | (2006.01) |
| B23K 1/00 | (2006.01) |
| C23C 22/44 | (2006.01) |
| C23C 22/83 | (2006.01) |
| F28F 19/02 | (2006.01) |
| F28F 21/08 | (2006.01) |
| B23P 15/26 | (2006.01) |
| C23C 22/73 | (2006.01) |
| C23C 22/00 | (2006.01) |

(52) U.S. Cl.
CPC ............ *B23K 1/0012* (2013.01); *B23P 15/26* (2013.01); *C23C 22/44* (2013.01); *C23C 22/73* (2013.01); *C23C 22/83* (2013.01); *F28F 19/02* (2013.01); *F28F 21/084* (2013.01); *B05D 2202/25* (2013.01); *C23C 2222/20* (2013.01); *F28F 2265/22* (2013.01); *Y10T 29/49393* (2015.01)

(58) Field of Classification Search
CPC ....... C23C 22/34; C23C 22/361; C23C 22/40; C23C 22/44; C23C 22/56; C23C 22/82; C23C 22/83; F28F 21/084; B05D 2202/25
See application file for complete search history.

(56) References Cited

U.S. PATENT DOCUMENTS

| | | | | |
|---|---|---|---|---|
| 4,992,115 | A | * | 2/1991 | Ikeda .................... C23C 22/44 148/247 |
| 6,361,833 | B1 | | 3/2002 | Nakada et al. |
| 6,554,916 | B2 | | 4/2003 | Kojima et al. |
| 6,869,677 | B1 | | 3/2005 | Uehara et al. |
| 7,503,381 | B2 | | 3/2009 | Inbe et al. |
| 2002/0040742 | A1 | | 4/2002 | Kojima et al. |
| 2003/0098091 | A1 | | 5/2003 | Opdycke et al. |
| 2003/0168127 | A1 | | 9/2003 | Hamamura et al. |
| 2003/0209293 | A1 | | 11/2003 | Sako et al. |
| 2003/0213533 | A1 | | 11/2003 | Sako et al. |
| 2006/0027629 | A1 | | 2/2006 | Inbe et al. |
| 2010/0170594 | A1 | | 7/2010 | Inbe et al. |
| 2013/0034743 | A1 | | 2/2013 | Bannai et al. |
| 2013/0284049 | A1 | | 10/2013 | Miura et al. |

FOREIGN PATENT DOCUMENTS

| | | |
|---|---|---|
| CN | 1323976 A | 11/2001 |
| CN | 1330729 A | 1/2002 |
| CN | 1730725 A | 2/2006 |
| EP | 1136591 A1 | 9/2001 |
| EP | 1324274 A2 | 7/2003 |
| JP | H01-208477 A | 8/1989 |

(Continued)

OTHER PUBLICATIONS

Notification that the Japan Patent Office has received an Information Statement by a third party issued to Japanese Application No. 2011-205809 dated Oct. 27, 2015.
Office Action in Chinese Patent Application No. 201280045677.6, mailed Mar. 26, 2015.
International Search Report for International Application No. PCT/JP2013/056547, dated May 28, 2013.
International Search Report for International Application No. PCT/JP2014/059901, dated Jul. 8, 2014.
Office Action for Chinese Patent Application No. 201380012367.9, dated Aug. 21, 2015.
Office Action for U.S. Appl. No. 14/382,922, dated Jun. 6, 2016.
Notification that the Japan Patent Office has received an Information Statement by a third party issued to Japanese Application No. 2013-047340, dated Jul. 19, 2016.

(Continued)

*Primary Examiner* — Lois Zheng
(74) *Attorney, Agent, or Firm* — Knobbe, Martens, Olson & Bear, LLP

(57) ABSTRACT

A surface treatment method capable of imparting exceptional corrosion resistance and moisture resistance to an NB heat exchanger. The method includes subjecting an NB heat exchanger to a chemical conversion treatment to form a chemical conversion film on the surface thereof using a chemical conversion treatment agent that contains zirconium and/or titanium in a total amount of 5-5,000 ppm by weight, vanadium in an amount of 10-1,000 ppm by weight, and has a pH of 2-6; bringing the NB heat exchanger on whose surface the chemical conversion film is formed into contact with a hydrophilization agent containing a hydrophilic resin and a guanidine compound and/or a salt thereof; and baking the NB heat exchanger subjected to the contacting process, whereby a hydrophilic film is formed on the surface thereof.

8 Claims, No Drawings

(56) References Cited

FOREIGN PATENT DOCUMENTS

| | | |
|---|---|---|
| JP | 2000-199077 A | 7/2000 |
| JP | 2000-345362 A | 12/2000 |
| JP | 2001-181860 A | 7/2001 |
| JP | 2002-030460 A | 1/2002 |
| JP | 2002-060699 A | 2/2002 |
| JP | 2002-275650 A | 9/2002 |
| JP | 2004-510882 | 4/2004 |
| JP | 2004-270030 A | 9/2004 |
| JP | 2005-008975 A | 1/2005 |
| JP | 2005-036161 A | 2/2005 |
| JP | 2006-69197 | 3/2006 |
| JP | 2007-238976 A | 9/2007 |
| JP | 2008-088552 A | 4/2008 |
| JP | 2008-231418 A | 10/2008 |
| JP | 2009-034589 | 2/2009 |
| JP | 2009-132952 A | 6/2009 |
| JP | 2010-261058 | 11/2010 |
| JP | 2011-042842 A | 3/2011 |
| JP | 2011-131206 | 7/2011 |
| JP | 2011-161876 | 8/2011 |
| JP | 2011-195942 A | 10/2011 |
| JP | 2011-214105 A | 10/2011 |
| JP | 2012-017524 A | 1/2012 |
| WO | WO 00/22188 A1 | 4/2000 |
| WO | WO 02/28550 | 4/2002 |
| WO | WO 2011/065482 A1 | 6/2011 |
| WO | WO 2011/099460 A1 | 8/2011 |

OTHER PUBLICATIONS

Office Action for Czech Patent Application No. 2014-179, dated Jul. 25, 2016.

Office Action for Japanese Patent Application No. 2013-047340, dated Oct. 18, 2016.

Office Action in Chinese Patent Application No. 201480019222.6, dated Nov. 2, 2016.

* cited by examiner

METHOD FOR TREATING SURFACE OF ALUMINUM HEAT EXCHANGER

This application is the U.S. National Phase under 35 U.S.C. §371 of International Application PCT/JP2012/074059, filed Sep. 20, 2012, designating the U.S., and published in Japanese as WO 2013/042725 on Mar. 28, 2013, which claims priority to Japanese Patent Application No. 2011-205809, filed Sep. 21, 2011, the entire contents of which are incorporated herein by reference.

TECHNICAL FIELD

The present invention relates to a method for treating a surface of an aluminum heat exchanger. More specifically, the present invention relates to a method for treating a surface of an aluminum heat exchanger which is subjected to flux brazing by employing a Nocolok brazing process.

BACKGROUND ART

In aluminum heat exchangers used for air conditioners in automobiles, in general, a plurality of fins are disposed at a narrow interval and tubes for supplying a refrigerant are disposed at the fins in a complicated manner in order to maximize a surface area from the viewpoint of improvement in heat exchange rate. In the heat exchangers having the above-described complicated structure, moisture in the air adheres to surfaces of the fins and tubes (hereinafter referred to as "fins and so forth") as condensed water during operation of the air conditioner. In the case where wettability of the surfaces of the fins and so forth is unsatisfactory, the adhered condensed water becomes semi-spherical water droplets or exists between the fins in the form of a bridge to undesirably increase ventilation resistance, thereby raising a problem of a reduction in heat exchange rate due to the inhibition of smooth flow of exhaustion. Therefore, for the purpose of imparting hydrophilicity to surfaces of the fins and so forth, a hydrophilization treatment is ordinarily performed.

Also, aluminum and an alloy thereof forming the fins and so forth are the materials which are essentially excellent in antirust property. However, when the condensed water stagnates on the surfaces of the fins and so forth for a long time, oxygen concentration cells are locally formed to cause a corrosion reaction to proceed. Further, if contaminant components in the air adhere to the cells to be concentrated, the corrosion reaction is promoted. A product generated by the corrosion reaction such as white rust is problematic since it is deposited on the surfaces of the fins and so forth to inhibit heat exchange characteristics and is discharged in the air by a blower.

Accordingly, various techniques for improving corrosion resistance through suppression of generation of white rust have been proposed. For example, as a chemical conversion treatment agent capable of imparting favorable corrosion resistance to a surface of aluminum or an alloy material thereof, a chemical conversion treatment agent including a titanium complex fluoride ion, a pentavalent vanadium compound ion, and a zirconium complex fluoride ion has been disclosed (see Patent Document 1).

Also, as a chemical conversion treatment agent capable of imparting favorable corrosion resistance to a surface of an aluminum heat exchanger, a chemical conversion treatment agent including a decavanadate ion equivalent to the pentavalent vanadium compound ion and a zirconium complex fluoride ion has been disclosed (see Patent Document 2).

By the way, the aluminum heat exchanger used for automotive air conditioners is produced by disposing and assembling the fins and so forth as described above, followed by bonding. Since the strong and dense oxide film is formed on the surface of aluminum, it has not been easy to attain the bonding by the brazing method which is not a mechanical bonding method, and devises such as brazing in vacuum have been needed in the bonding.

As the countermeasure, flux brazing methods using a halogen-based flux have recently been developed as a means for effectively removing the oxide film on the surface, and, among them the Nocolok brazing process (hereinafter referred to as "NB process") including brazing in a nitrogen gas has widely been employed from the viewpoints of easy brazing control and a low processing cost. With the NB process, the fins and so forth are disposed and assembled, and then the fins and so forth are subjected to the brazing using the flux such as $KAlF_4$ and $K_2AlF_5$ in a nitrogen gas.

However, in the aluminum heat exchanger produced by the NB process (hereinafter referred to as "NB heat exchanger"), the flux inevitably remains on the surfaces of the fins and so forth. Therefore, a surface state (potential state and the like) of the fins and so forth is fluctuated to make it difficult to obtain a uniform chemical conversion film and a uniform hydrophilic film by a post-treatment. Thus, a problem of failing to obtain favorable corrosion resistance and hydrophilicity has been raised.

Accordingly, as an NB heat exchanger surface treatment method capable of imparting the favorable corrosion resistance and hydrophilicity as well as a deodorizing property which is one of important characteristics for use as an automotive air conditioner, a hydrophilization technique including performing a chemical conversion treatment by dipping the NB heat exchanger into a chemical conversion treatment agent including at least one of a zirconium complex fluoride ion and a titanium complex fluoride ion and then dipping the NB heat exchanger into a hydrophilization treatment agent including polyvinyl alcohol, polyoxyalkylene-modified polyvinyl alcohol, an inorganic crosslinking agent, a guanidine compound, and so forth has been disclosed (see Patent Document 3).

Also, as a surface treatment method capable of maintaining hydrophilicity, high corrosion resistance, and an antibacterial and deodorizing property on the surface of an aluminum or aluminum alloy base material for a long time, a technique including a surface adjustment step for adjusting a surface of an aluminum or aluminum alloy base material to the one which is suitable for formation of a chemical conversion film, a step for washing with water, a step for forming on the surface of the aluminum or aluminum alloy base material a first protection layer including the chemical conversion film, a step for washing with water, a step for coating the first protection layer with a second protection layer which is an organic film, and a drying step, the steps being performed in this order, has been disclosed (see Patent Document 4). With the technique, the first protection layer is formed by using a chemical conversion treatment liquid including vanadium and at least one kind of metal selected from among titanium, zirconium, and hafnium, and the second protection layer is formed by using a composition including (1) a chitosan derivative and a solubilizing agent, (2) modified polyvinyl alcohol obtainable by graft polymerization of a hydrophilic polymer on a side chain of polyvinyl alcohol, and (3) a water-soluble crosslinking agent.

[Patent Document 1] Japanese Unexamined Patent Application, Publication No. 2010-261058

[Patent Document 2] Japanese Unexamined Patent Application (Translation of PCT Application), Publication No. 2004-510882

[Patent Document 3] Japanese Unexamined Patent Application, Publication No. 2006-69197

[Patent Document 4] Japanese Unexamined Patent Application, Publication No. 2011-161876

DISCLOSURE OF THE INVENTION

Problems to be Solved by the Invention

In recent years, in the NB heat exchangers for automotive air conditioners, improvement in moisture resistance has been considered important in addition to the improvement in corrosion resistance. The index of the corrosion resistance is white rust as described above, while an index for the moisture resistance is blackening. The white rust is a corrosion phenomenon which occurs locally due to a corrosion factor such as oxygen, water, and a chloride ion, while the blackening is a corrosion phenomenon which occurs on an entire surface due to the existence of oxygen, water, and heat. Therefore, in the NB heat exchanger for automotive air conditioners which is used under an environment of being exposed to intense heat, there is a demand for improving the moisture resistance by suppressing the occurrence of blackening in addition to the corrosion resistance.

However, in the technique of Patent Document 1, the object which is subjected to the treatment is not the heat exchanger first of all, and the technique is not intended to improve the moisture resistance. Also, since the treatment object is not the heat exchanger in the technique, no hydrophilization treatment is performed.

In the technique of Patent Document 2, the treatment object is the aluminum heat exchanger, but the moisture resistance is not discussed at all since the technique is not intended to improve the moisture resistance. Also, since this technique focuses on the impartment of favorable corrosion resistance, the hydrophilization treatment is not discussed at all.

In the technique of Patent Document 3, the treatment object is the NB heat exchanger for automotive air conditioner, and the technique is capable of imparting the favorable deodorizing property in addition to the favorable corrosion resistance and hydrophilicity. However, the technique does not focus on the moisture resistance. Therefore, the technique of Patent Document 3 does not discuss the moisture resistance at all and is not capable of obtaining excellent moisture resistance. Further, Patent Document 3 does not describe any embodiment in which the chemical conversion treatment agent contains a predetermined amount of the vanadium ion. The evaluation time of the corrosion resistance of Patent Document 3 is very much shorter than the present invention, and the level of the corrosion resistance is inferior to the present invention.

In the technique of Patent Document 4, the treatment object is the aluminum or aluminum alloy heat exchanger. The technique is capable of imparting the hydrophilicity, high corrosion resistance, antibacterial property, moisture resistance, and deodorizing property for a long time, but Patent Document 4 does not described any embodiment in which the guanidine compound is contained in the hydrophilization treatment agent. Also, the evaluation time of the corrosion resistance of Patent Document 4 is very much shorter than the present invention, and the evaluation temperature of the moisture resistance is very much lower than the present invention. The level of each of the corrosion resistance and the moisture resistance is inferior to the present invention.

As described above, a surface treatment method which is capable of imparting excellent corrosion resistance (white rust resistance) and moisture resistance (blackening resistance) to the NB heat exchanger used in automotive air conditioners has not been established yet.

The present invention was accomplished in view of the above described problems, and an object thereof is to provide a surface treatment method which is capable of imparting excellent corrosion resistance (white rust resistance) and moisture resistance (blackening resistance) to NB heat exchangers used in automotive air conditioners.

Means for Solving the Problems

In order to achieve the above-described object, the present invention provides a surface treatment method for an aluminum heat exchanger which is subjected to flux brazing by employing a Nocolok brazing process, including:

(a) a step for forming a chemical conversion film on a surface of the aluminum heat exchanger by subjecting the aluminum heat exchanger to a chemical conversion treatment using a chemical conversion treatment agent including at least one of zirconium and titanium of which a content is 5 to 5,000 mass ppm in total, and vanadium of which a content is 10 to 1,000 mass ppm, and having a pH of 2 to 6;

(b) a step for bringing the aluminum heat exchanger in which the chemical conversion film is formed on the surface in the step (a) into contact with a hydrophilization treatment agent including a hydrophilic resin and at least one of a guanidine compound represented by the following general formula (1) and a salt thereof:

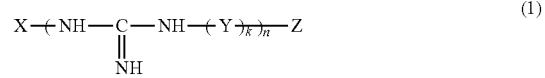

[in the formula (1), Y represents —C(=NH)—(CH$_2$)$_m$, —C(=O)—NH—(CH$_2$)$_m$, or —C(=S)—NH—(CH$_2$)$_m$—; m represents an integer of 0 to 20; n represents a positive integer; k represents 0 or 1; X represents hydrogen, an amino group, a hydroxyl group, a methyl group, a phenyl group, a chlorophenyl group, or a methylphenyl(tolyl) group; and Z represents hydrogen, an amino group, a hydroxyl group, a methyl group, a phenyl group, a chlorophenyl group, a methylphenyl(tolyl) group, or a polymer represented by the following general formula (2) and having a mass average molecular weight of 200 to 1,000,000]

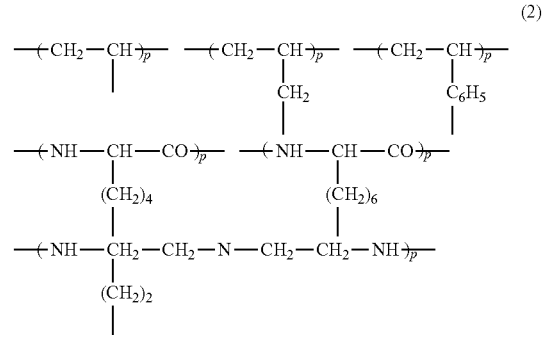

[in the formula (2), p represents a positive integer]; and (c) a step for forming a hydrophilic film by subjecting the aluminum heat exchanger which is subjected to the contact treatment in the step (b) to a baking treatment.

The guanidine compound and the salt thereof may preferably be a guanidine compound having a biguanide structure represented by the following general formula (4) and a salt thereof:

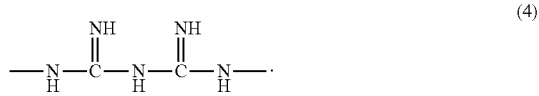

(4)

A sum of an amount of zirconium and an amount of titanium may preferably be 5 to 300 mg/m$^2$ and an amount of vanadium may preferably be 1 to 150 mg/m$^2$ in the chemical conversion film formed in the step (a), and a coating amount of the hydrophilic film formed in the step (c) may preferably be 0.05 to 5 g/m$^2$.

Preferably, the chemical conversion film formed in the step (a) includes both of zirconium and titanium.

Preferably, the hydrophilization treatment agent used in the step (b) further includes at least one kind selected from the group consisting of phosphoric acid, condensed phosphoric acid, phosphonic acid, derivatives thereof, and a lithium ion.

Preferably, the hydrophilic resin in the hydrophilization treatment agent used in the step (b) includes at least one of polyvinyl alcohol and modified polyvinyl alcohol each having a saponification degree of 90% or more.

Effects of the Invention

According to the present invention, a surface treatment method capable of imparting excellent corrosion resistance (white rust resistance) and moisture resistance (blackening resistance) to NB heat exchangers used for automotive air conditioners is provided.

PREFERRED MODE FOR CARRYING OUT THE INVENTION

A surface treatment method according to the present embodiment includes performing a surface treatment on an aluminum heat exchanger which is subjected to flux brazing by employing a Nocolok brazing process. The surface treatment method according to the present embodiment comprises (a) a chemical conversion treatment step, (b) a hydrophilization treatment step, and (c) a baking step.

[Heat Exchanger]

An NB heat exchanger which is an object to be subjected to the surface treatment method according to the present embodiment is the aluminum heat exchanger which is subjected to flux brazing by the NB process. The NB heat exchanger is suitably used for automotive air conditioners. As used herein, the term "aluminum" means aluminum or an aluminum alloy (hereinafter simply referred to as "aluminum").

In the NB heat exchanger, as described above, a plurality of fins are disposed at a narrow interval in order to maximize a surface area thereof from the viewpoint of improvement in heat exchange rate, and tubes for supplying a refrigerant are disposed at the fins in a complicated manner. Also, since the brazing is performed by using a flux in a nitrogen gas after the assembly of the fins and so forth, the flux inevitably remains on the surfaces of the fins and so forth. Therefore, a surface state (potential state and the like) of the fins and so forth are fluctuated to make it difficult to obtain a uniform chemical conversion film and a uniform hydrophilic film with the use of the conventional chemical conversion treatment agents.

As the flux, a halogen-based flux which is typically used in the NB process may be used. As the halogen-based flux, at least one kind selected from the group consisting of $KAlF_4$, $K_2AlF_5$, $K_3AlF_6$, $CsAlF_4$, $Cs_3AlF_6$, and $Cs_2AlF_5$ may be used.

[(a) Chemical Conversion Treatment Step]

The chemical conversion treatment step (a) of the present embodiment is the step for forming a chemical conversion film on a surface of the NB heat exchanger by subjecting the NB heat exchanger to a chemical conversion treatment using a chemical conversion treatment agent including at least one of zirconium and titanium of which a content is 5 to 5,000 mass ppm in total and vanadium of which a content is 10 to 1,000 mass ppm and having a pH of 2 to 6.

The NB heat exchanger may be subjected to pickling in advance of the chemical conversion treatment as required for the purpose of further improving the chemical conversion effect. Conditions for the pickling are not particularly limited, and the treatment conditions which have heretofore been used for the pickling of the NB heat exchangers may be adopted.

In the chemical conversion treatment agent of the present embodiment, each of zirconium, titanium, and vanadium exists as various ions such as a complex ion. Therefore, in the present specification, a content of each of zirconium, titanium, and vanadium means a value of the various ions in terms of the metal element.

The chemical conversion treatment agent of the present embodiment includes at least one of the zirconium ion and the titanium ion; and the vanadium ion, and is obtainable by dissolving at least one of a zirconium-based compound and a titanium-based compound; and a vanadium-based compound into water. More specifically, the chemical conversion treatment agent of the present embodiment is a solution including as active species at least one of the zirconium ion and the titanium ion; and the vanadium ion. A preferred chemical conversion treatment agent of the present embodiment includes all of the zirconium ion, titanium ion, and vanadium ion as the active species.

The zirconium ion is modified by a chemical conversion reaction so that a zirconium precipitate formed mainly of zirconium oxide is precipitated on the surface of aluminum. Examples of the zirconium-based compound which is a source of the zirconium ion include a zirconium compound such as fluorozirconic acid and zirconium fluoride as well as a salt of lithium, sodium, potassium, ammonium, or the like thereof. Also, a zirconium-based compound obtained by dissolving the zirconium compound such as zirconium oxide with a fluoride such as hydrofluoric acid may be used. Since these zirconium-based compounds contain fluorine, they have a function of etching the aluminum surface.

The titanium ion is modified by the chemical conversion reaction to cause a titanium precipitate formed mainly of titanium oxide is precipitated on the aluminum surface. Since a sedimentation pH of the titanium ion is lower than the above-described zirconium ion, the titanium precipitate per se is readily precipitated, and precipitations of the zirconium precipitate described above and a vanadium precipitate described later in this specification are accelerated. As a result, a coating amount of the chemical conversion film formed mainly of these precipitates is increased. Also, the titanium ion is readily precipitated even in the vicinity of the flux remaining on the surface of the NB heat exchanger to realize the precipitation of the titanium precipitate.

Examples of the titanium-based compound which is a source of the titanium ion include a titanium compound such as fluorotitanic acid and titanium fluoride as well as a salt of lithium, sodium, potassium, ammonium, or the like thereof. Also, a titanium-based compound obtained by dissolving the titanium compound such as titanium oxide with a fluoride such as hydrofluoric acid may be used. Since these titanium-based compounds contain fluorine like the above-described zirconium-based compounds, they have a function of etching the aluminum surface. The etching function is superior to the above-described zirconium-based compound.

In the present embodiment, since the chemical conversion treatment agent contains at least one of the zirconium ion and the titanium ion and the vanadium ion, the chemical conversion film containing at least one of zirconium and titanium and vanadium is formed. Since the vanadium ion has the property of sedimenting at a lower pH than the titanium ion, the vanadium precipitate formed mainly of vanadium oxide is precipitated on the aluminum surface. More specifically, since the vanadium ion is converted into vanadium oxide by the reduction reaction, the vanadium precipitate is precipitated on the aluminum surface.

Unlike the zirconium precipitate and the titanium precipitate which have the property of entirely coating the aluminum surface except for a part of the aluminum surface, the vanadium precipitate has the property of being readily precipitated on a segregated substance on the aluminum surface though it is difficult to form the zirconium precipitate and the titanium precipitate on the segregated substance. Therefore, according to the chemical conversion treatment agent of the present embodiment, the chemical conversion film having high density and high coating property is formed primarily by the zirconium precipitate, titanium precipitate, and vanadium precipitate as compared to the conventional chemical conversion treatment agents which do not contain the vanadium ion.

Also, the vanadium precipitate has a property of obtaining an excellent film forming property since it exhibits a self-repair effect like a conventional chrome film owing to the coexistence with zirconium and titanium. More specifically, the self-repair is attained in such a manner that a very small amount of the vanadium ion is appropriately eluted from the vanadium precipitate to oxidize the aluminum surface, thereby attaining passivation of the aluminum surface. Thus, the favorable corrosion resistance is maintained. In the case where the vanadium ion does not coexist with the zirconium ion and the titanium ion, the vanadium precipitate is hardly precipitated. Even if the vanadium precipitate is precipitated, a large amount of the vanadium ion will be eluted from the precipitate, and the above-described self-repair effect will not be obtained.

In the present embodiment, preferably, the chemical conversion treatment agent contains the zirconium ion, the titanium ion, and the vanadium ion so that the chemical conversion film containing zirconium, titanium, and vanadium is formed. By using the active treatment agent containing all of the zirconium ion, titanium ion, and vanadium ion as active species, it is possible to form the chemical conversion film having high density and coating property even in the vicinity of the flux.

As the vanadium-based compound, divalent to pentavalent vanadium compounds are usable. More specifically, examples thereof include methavanadic acid, ammonium methavanadate, sodium methavanadate, vanadium pentoxide, vanadium oxytrichloride, vanadyl sulfate, vanadyl nitrate, vanadyl phosphate, vanadium oxide, vanadium dioxide, vanadium oxyacetyl acetonate, vanadium chloride, and the like. Since these vanadium-based compounds do not contain fluorine, they do not have the function of etching the aluminum surface.

In the present embodiment, the tetravalent or pentavalent vanadium compound is preferred, and, more specifically, vanadyl sulfate (tetravalent) and ammonium methavanadate (pentavalent) are preferably used.

As described above, in the chemical conversion treatment agent of the present embodiment, the total of the contents of the zirconium ion and the titanium ion is 5 to 5,000 mass ppm, and the content of the vanadium ion is 10 to 1,000 mass ppm in terms of the metal. When these requirements are satisfied, the corrosion resistance (white rust resistance) and the moisture resistance (blackening resistance) of the NB heat exchanger are largely improved and favorable hydrophilicity and deodorizing property are obtained by the synergy of the combination with the hydrophilization treatment described later in this specification.

Also, from the viewpoint of further enhancing the above-described effects, it is preferable that the content of zirconium is 5 to 3,000 mass ppm, the content of titanium is 5 to 500 mass ppm, and the content of vanadium is 10 to 500 ppm.

Further, as described above, the pH of the chemical conversion treatment agent of the present embodiment may be 2 to 6, preferably 3 to 5. When the pH is 2 or more, the chemical conversion film is formed without causing chemical conversion treatment agent-attributable excessive etching, thereby obtaining the excellent corrosion resistance and moisture resistance. When the pH is 6 or less, the chemical conversion film having the satisfactory coating amount is formed without causing etching deficiency, thereby obtaining the excellent corrosion resistance and moisture resistance. The pH of the chemical conversion treatment agent may be adjusted by using a general acid or alkali such as sulfuric acid, nitric acid, and ammonium.

The chemical conversion treatment agent of the present embodiment may contain a metal ion such as manganese, zinc, cerium, trivalent chrome, magnesium, strontium, calcium, tin, copper, iron, and a silicon compound and the like, a phosphorus compound such as phosphonic acid, phosphoric acid, and condensed phosphoric acid and the like, an antirust agent such as a phenol resin, polyacrylic acid, and a polyacrylic acid derivative for the purpose of improving the antirust property as well as polyallylamine, various silane coupling agents such as aminosilane and epoxysilane, and the like for the purpose of improving the adhesiveness.

Also, the chemical conversion treatment agent of the present embodiment may contain 50 to 5,000 mass ppm of an aluminum ion and 1 to 100 mass ppm of a free fluorine ion.

The aluminum ion is eluted also from the aluminum of the treatment object into the chemical conversion treatment agent, but it is possible to promote the chemical conversion treatment reaction by positively adding the aluminum ion in addition to the eluted aluminum ion. Further, by setting the free fluorine ion concentration to a value higher than the conventional one, it is possible to form the chemical conversion film having more excellent corrosion resistance.

From the viewpoint of further enhancing the above-described effect, the content of the aluminum ion may more preferably be 100 to 3,000 mass ppm, further preferably 200 to 2,000 mass ppm. Likewise, the content of the free fluorine ion may more preferably be 5 to 80 mass ppm, further preferably 15 to 50 mass ppm.

Examples of a source of the aluminum ion include an aluminate such as aluminum nitrate, aluminum sulfate, aluminum fluoride, aluminum oxide, alum, aluminum silicate, and sodium aluminate and a fluoroaluminum salt such as sodium fluoroaluminate.

Examples of a source of the free fluorine ion include hydrofluoric acid and a salt thereof such as hydrofluoric acid, ammonium hydrogen fluoride, zirconium hydrofluoric acid, and titanium hydrofluoric acid; a metal fluoride such as sodium fluoride, zirconium fluoride, and titanium fluoride; ammonium fluoride; and the like. In the case of using zirconium fluoride, titanium fluoride, or the like as the source of the free fluoride ion, it serves also as the source of the zirconium ion or the titanium ion.

A method of the chemical conversion treatment of the present embodiment is not particularly limited, and either one of a spraying method and a dipping method may be employed. A temperature of the chemical conversion treatment agent may preferably be 50° C. to 70° C., more preferably 55° C. to 65° C. A chemical conversion treatment time may preferably be 20 to 900 seconds, more preferably 30 to 600 seconds. When the above-described requirements are satisfied, the chemical conversion film having excellent corrosion resistance and moisture resistance is formed.

In the chemical conversion film of the present embodiment which is formed on the surface of the NB heat exchanger as described above, a sum of zirconium and titanium may preferably be 5 to 300 mg/m$^2$, and an amount of vanadium may preferably be 1 to 150 mg/m$^2$. By satisfying the above requirements, the excellent corrosion resistance and moisture resistance are obtained. A ratio between the zirconium amount and the titanium amount is varied depending on a surface state of the NB heat exchanger to be treated, particularly on an amount of a segregated substance and the like, and a value of the ratio is not limited insofar as the sum is within the above-specified range at the value. It is possible to calculate the zirconium amount, the titanium amount, and the vanadium amount in the chemical conversion film from results of measurements conducted by attaching fins to have the size of 10 mm×10 mm or more and using a fluorescent X-ray analysis device "XRF-1700" (Shimadzu Corporation).

[(b) Hydrophilization Treatment Step]

The hydrophilization treatment step (b) of the present embodiment is the step for bringing the NB heat exchanger in which the chemical conversion film is formed on the surface in the chemical conversion step (a) into contact with a hydrophilization treatment agent containing a hydrophilic resin and at least one of a guanidine compound represented by the following general formula (1) described later and a salt thereof.

The hydrophilization treatment agent of the present embodiment is an aqueous solution or an aqueous dispersion liquid in which: the hydrophilic resin is included in an aqueous solvent; and at least one of the guanidine compound and the salt thereof is included.

As the hydrophilic resin of the present embodiment, a water-soluble or water-dispersible hydrophilic resin containing in a molecule at least one of a hydroxyl group, a carboxyl group, an amide group, an amino group, a sulfonic acid group, and an ether group is preferred without particular limitation thereto. The hydrophilic resin of the present embodiment may preferably be the one which is capable of forming a hydrophilic film of which a contact angle with a water droplet is 40° or less from the viewpoint of obtaining favorable hydrophilicity.

As specific examples of the hydrophilic resin, it is preferable to use an acryl-based polymer having polyoxyethylene chain such as polyvinyl alcohol, polyvinyl pyrrolidone, polyacrylic acid, sodium polyvinylsulfonate, polystyrenesulfonic acid, polyacrylamide, carboxymethyl cellulose, chitosan, polyethylene oxide, water-soluble nylon, a copolymer of monomers forming these polymers, a 2-methoxypolyethylene glycol methacrylate/2-hydroxylethyl acrylate copolymer, and the like. These may be used alone or in combination of two or more kinds thereof.

The above-described hydrophilic resins have excellent hydrophilicity and water resistance, are per se free from odor, and have a property of hardly adsorbing an odor substance. Therefore, with the use of the hydrophilization treatment agent containing the hydrophilic resin, the hydrophilic film to be obtained has the excellent hydrophilicity and deodorizing property and is hardly deteriorated when exposed to a water droplet or running water. Further, with the hydrophilic film, since an inorganic substance such as silica which has a dusty odor and a remaining monomer component which adsorbs the odor substance are hardly exposed, the excellent deodorizing property is obtained.

A number average molecular weight of the hydrophilic resin of the present embodiment may preferably be within the range of 1,000 to 1,000,000. When the number average molecular weight is 1,000 or more, physical properties of the film such as hydrophilicity, deodorizing property, and film formation property are favorable. When the number average molecular weight is 1,000,000 or less, a viscosity of the hydrophilization treatment agent is prevented from being excessively high to have favorable workability and film physical properties. A more preferred number average molecular weight is within the range of 10,000 to 200,000. The number average molecular weight in the present specification is a value in terms of standard polystyrene which was measured by the gel permeation chromatography (GPC).

Among the above-described hydrophilic resins, polyvinyl alcohol is preferred from the viewpoint of excellent hydrophilicity and deodorizing property, and polyvinyl alcohol and modified polyvinyl alcohol each having a saponification degree of 90% or more are particularly preferred. By using at least one of the above-described polyvinyl alcohol and modified polyvinyl alcohol, the excellent hydrophilicity and deodorizing property are obtained. A more preferred saponification degree is 95% or more.

Examples of the modified polyvinyl alcohol include polyoxyalkylene-modified polyvinyl alcohol in which 0.01% to 20% of pendant groups is a polyoxyalkylene ether group represented by the following general formula (3).

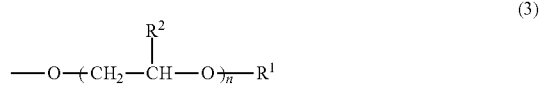
(3)

[In the above formula (3), n represents an integer of 1 to 500; R$^1$ represents a hydrogen atom or an alkyl group having 1 to 4 carbon atoms; and R$^2$ represents a hydrogen atom or a methyl group.]

In the above-described polyoxyalkylene-modified polyvinyl alcohol, a polyoxyalkylene-modified group may preferably be 0.1% to 5% of the pendant groups, and a polymerization degree n of the polyoxyalkylene-modified group may preferably be 3 to 30. By satisfying the above requirements, the favorable hydrophilicity is obtained owing to hydrophilicity of the polyoxyalkylene-modified group. Examples of the polyoxyalkylene-modified polyvinyl alcohol include ethylene oxide-modified polyvinyl alcohol.

In the present embodiment, a content of the hydrophilic resin in the hydrophilization treatment agent is not particularly limited and may preferably be 10 to 99 mass %, more preferably 30 to 95 mass %, in a solid content of the hydrophilization treatment agent. With the content, the favorable hydrophilicity and deodorizing property are obtained.

The guanidine compound to be contained in the hydrophilization treatment agent of the present embodiment is represented by the following general formula (1). Since the guanidine compound contains a large amount of nitrogen as indicated below, it has the property of favorably adhering to the chemical conversion film containing at least one of zirconium and titanium; and vanadium and, further, the property of being readily adsorbed by the aluminum surface via the thin chemical conversion film having a thickness of about 0.1 μm. Therefore, by incorporating the guanidine compound into the hydrophilization treatment agent, it is possible to coat the aluminum or aluminum alloy base material with the chemical conversion film and the hydrophilization treatment film, thereby suppressing generation of the blackening. More specifically, the hydrophilization treatment agent of the present embodiment is capable of imparting the excellent corrosion resistance as well as the favorable moisture resistance owing to the incorporation of the guanidine compound.

Further, in the present embodiment, since the flux-brazed aluminum heat exchanger is subjected to the chemical conversion treatment using the chemical conversion treatment agent containing at least one of zirconium and titanium; and vanadium and then to the treatment using the hydrophilization treatment agent containing the hydrophilic resin and at least one of the guanidine compound and the salt thereof, the two-stage antirust treatments are performed, and a satisfactory antirust effect is as a result obtained on an entire surface of the aluminum heat exchanger even when the flux is partially present on the surface.

In the case where the chemical conversion film contains all of zirconium, titanium, and vanadium, it is considered that adhesiveness between the hydrophilic film containing the guanidine compound and the chemical conversion film containing all of zirconium, titanium, and vanadium is particularly favorable. Therefore, the chemical conversion film containing all of zirconium, titanium, and vanadium is more preferred since the effect was found, in which considerably improving moisture resistance on the entire surface of the aluminum or aluminum alloy base material including the vicinity of the flux.

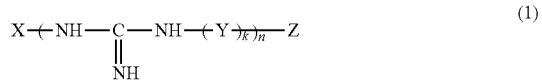

[in the formula (1), Y represents —C(=NH)—(CH$_2$)$_m$—, —C(=O)—NH—(CH$_2$)$_m$—, or —C(=S)—NH—(CH$_2$)$_m$—; m represents an integer of 0 to 20; n represents a positive integer; k represents 0 or 1; X represents hydrogen, an amino group, a hydroxyl group, a methyl group, a phenyl group, a chlorophenyl group, or a methylphenyl (tolyl) group; and Z represents hydrogen, an amino group, a hydroxyl group, a methyl group, a phenyl group, a chlorophenyl group, a methylphenyl(tolyl) group, or a polymer represented by the following general formula (2) and having a mass average molecular weight of 200 to 1,000,000.]

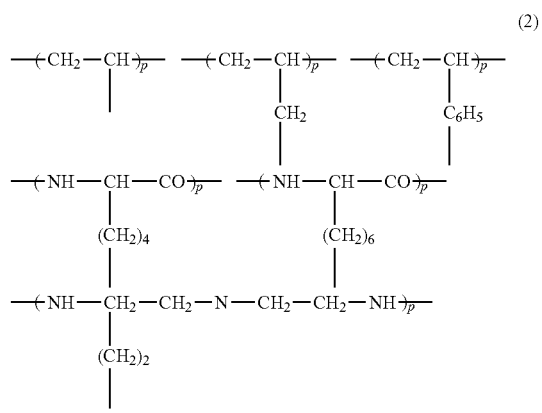

[In the formula (2), p represents a positive integer.]

Examples of the guanidine compound include guanidine, amino guanidine, guanylthiourea, 1,3-diphenylguanidine, 1,3-di-o-tolylguanidine, 1-o-tolylbiguanide, polyhexamethylene biguanide, polyhexaethylene biguanide, polypentamethylene biguanide, polypentaethylene biguanide, polyvinyl biguanide, polyallyl biguanide, and the like.

Also, examples of the salt of the guanidine compound include organic acid salts of the above described guanidine compounds such as phosphate, chlorate, sulfate, acetate, and gluconate. A total amount of the salts of the guanidine compounds may preferably be within the range of 0.01 to 100 by molar ratio relative to a total amount of the guanidine compound and the salts thereof. With this total amount, the favorable corrosion resistance and moisture resistance are obtained.

A number average molecular weight of each of the guanidine compound and the salt thereof of the present embodiment may preferably be within the range of 59 to 1,000,000. As indicated by the general formula (1) above, the smallest value of the molecular weight of the guanidine compound is 59, and the water-solubility is attained when the number average molecular weight is 1,000,000 or less. Within the above-specified range, the favorable corrosion resistance and moisture resistance are obtained. From the viewpoint of further enhancing the above-described effect, the lower limit value of the number average molecular weight may more preferably be 300, further preferably 500. On the other hand, the upper limit value may more preferably be 100,000, further preferably 20,000.

As the guanidine compound and the salt thereof of the present embodiment, the guanidine compound and the salt thereof having a biguanide structure represented by the following general formula (4) in a molecule is preferred among the guanidine compounds and the salts thereof represented by the above general formulas (1) and (2) since they have an effect of obtaining excellent corrosion resistance and moisture resistance.

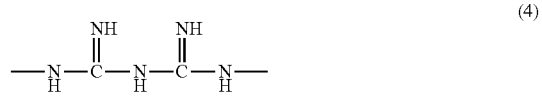

Examples of the guanidine compound and the salt thereof having the above biguanide structure include polyhexamethylene biguanide, 1-o-tolylbiguanide, and chlorhexydine gluconate and salts thereof, and the like. These may be used alone or in combination of two or more kinds thereof.

A sum of contents of the guanidine compound and the salt thereof in the present embodiment may preferably be 1 to 40 mass % relative to the solid content of the hydrophilization treatment agent. With the sum, the excellent corrosion resistance and moisture resistance are obtained. From the viewpoint of further enhancing the effect, the sum may more preferably be 5 to 30 mass %.

Preferably, the hydrophilization treatment agent of the present embodiment further includes at least one kind selected from the group consisting of phosphoric acid, condensed phosphoric acid, phosphonic acid, derivatives thereof, and a lithium ion.

By containing the phosphorus-based compound such as phosphoric acid, condensed phosphoric acid, phosphonic acid, and the derivatives thereof in the hydrophilization treatment agent of the present embodiment, the hydrophilic film containing the phosphorus-based compound is formed on the aluminum surface. Therefore, even in the case where aluminum is eluted from the aluminum surface, the eluted aluminum reacts with the phosphorus-based compound in the hydrophilic film and forms aluminum phosphate to insolubilize the aluminum, thereby suppressing further elution of aluminum for a long time. Thus, the excellent corrosion resistance and moisture resistance are obtained.

Examples of the phosphorus-based compound include phosphoric acid, polyphosphoric acid, tripolyphosphoric acid, methaphosphoric acid, ultraphosphoric acid, phytic acid, phosphinic acid, hydroxyethylidene diphosphonic acid, nitrilotris(methylenephosphonic acid), phosphonobutanetricarboxylic acid (hereinafter abbreviated to "PBTC"), ethylenediaminetetra(methylenephosphonic acid), a tetrakis(hydroxymethyl)phosphonium salt, an acryl-phosphonate copolymer, and the like. These may be used alone or in combination of two or more kinds thereof.

A content of the phosphorus-based compound may preferably be 0.05 to 25 mass % relative to the solid content of the hydrophilization treatment agent. With the content, the excellent corrosion resistance and moisture resistance are attained. From the viewpoint of further enhancing the effect, the content may more preferably be 0.1 to 10 mass %.

The hydrophilization treatment agent of the present embodiment contains the lithium ion, thereby attains the excellent corrosion resistance and moisture resistance by the below-described mechanism.

More specifically, when an alkali metal ion such as a potassium ion in the halogen-based flux remaining on the surface of the NB heat exchanger and the lithium ion of the hydrophilic film cause an ion exchange reaction indicated by the following formula (5), for example, a hardly-soluble film is formed at an interface between the flux residue and the hydrophilic film. Therefore, the excellent corrosion resistance and moisture resistance are attained as a result of suppression of aluminum elution from the aluminum surface by the thus-formed hardly-soluble film. Since the lithium ion remains in the hydrophilic film for a long time, the above-described effect is maintained for a long time.

$$K_xAlF_y + xLi^+ \rightarrow Li_xAlF_y + xK^+ \quad (5)$$

[In the above formula (5), the combination of x and y is such that x is 1 and y is 4, x is 2 and y is 5, or x is 3 and y is 6].

A source of the lithium ion is not particularly limited insofar as the source is a lithium compound which is capable of generating the lithium ion in the hydrophilization treatment agent, and examples thereof include lithium hydroxide, lithium sulfate, lithium carbonate, lithium nitrate, lithium acetate, lithium citrate, lithium lactate, lithium phosphate, lithium oxalate, lithium silicate, lithium methasilicate, and the like. Among these, lithium hydroxide, lithium sulfate, and lithium carbonate are preferred from the viewpoint of less influence on odor. These may be used alone or in combination of two or more kinds thereof.

A content of the lithium ion may preferably be 0.01 to 25 mass % in terms of the metal relative to the solid content of the hydrophilization treatment agent. With the content, the excellent corrosion resistance and moisture resistance are attained. From the viewpoint of further enhancing the effect, the content may more preferably be 0.05 to 5 mass %.

From the viewpoint of improving the water resistance of the hydrophilic film, the hydrophilization treatment agent of the present embodiment may contain a crosslinking agent as required. As the crosslinking agent, an inorganic crosslinking agent or an organic crosslinking agent capable of reacting with the hydroxyl group of the polyvinyl alcohol or modified polyvinyl alcohol is usable.

Examples of the inorganic crosslinking agent include a silica compound such as silica dioxide, a zirconium compound such as zirconium ammonium fluoride and zirconium ammonium carbonate, a metal chelate compound such as titanium chelate, a metal salt such as Ca, Al, Mg, Fe, Zn, etc., and the like. These inorganic crosslinking agents also have the effect of reducing a contact angle of water by forming minute irregularity on the surface of the hydrophilic film in addition to the improvement in water resistance.

Examples of the organic crosslinking agent include a melamine resin, a phenol resin, an epoxy compound, a blocked isocyanate compound, an oxazoline compound, a carbodiimide compound, and the like. These crosslinking agents may be used alone or in combination of two or more kinds thereof.

A content of these crosslinking agent may preferably be 0.1 to 50 mass % relative to the solid content of the hydrophilization treatment agent. With the content, the excellent water resistance is obtained. From the viewpoint of further enhancing the effect, the content may more preferably be 0.5 to 30 mass %.

The hydrophilization treatment agent of the present embodiment may contain a dispersant, an antirust agent, a pigment, a silane coupling agent, an antibacterial agent (antiseptic agent), a lubricant, a deodorizing agent, and the like as arbitrary components.

Examples of the dispersant include, but are not particularly limited to, various surfactants and dispersing resins.

Examples of the antirust agent include, but are not particularly limited to, tannic acid, an imidazole compound, a triazine compound, a triazole compound, a hydrazine compound, a zirconium compound, and the like. Among these, the zirconium compound is preferred from the viewpoint of obtaining the excellent corrosion resistance and moisture resistance. Examples of the zirconium compound include, but are not particularly limited to, alkali metal fluorozirconate such as $K_2ZrF_6$, soluble fluorozirconate such as fluorozirconate including $(NH_4)_2ZrF_6$ and the like, fluorozirconic acid such as $H_2ZrF_6$, zirconium fluoride, zirconium oxide, and the like.

Examples of the pigment include, but are not particularly limited to, various coloring pigments including an inorganic pigment such as titanium oxide, zinc oxide, zirconium oxide, calcium carbonate, barium sulfate, alumina, kaolin clay, carbon black, and iron oxide ($Fe_2O_3$, $Fe_3O_4$, etc.), an organic pigment, and the like.

The silane coupling agent is capable of improving adhesiveness between the hydrophilic resin and the above described pigment by enhancing affinity between them. Examples of the silane coupling agent include, but are not particularly limited to, γ-aminopropyltrimethoxysilane, γ-aminopropyltriethoxysilane, γ-glycidoxypropyltrimethoxysilane, γ-methacryloxypropyltriethoxysilane, N-[2-(vinylbenzylamino)ethyl]-3-aminopropyltrimethoxysilane, and the like. The silane coupling agent may be a condensate or a polymer.

Examples of the antibacterial agent (antiseptic agent) include, but are not particularly limited to, 2-(4-thiazolyl) benzimidazole, zinc pyrithione, benzoisothiazoline, and the like.

A content of the arbitrary components may preferably be 0.01 to 50 mass % in total relative to the solid content of the hydrophilization treatment agent. With the content, effects of the arbitrary components are exhibited without impairing the effects of the hydrophilization treatment agent. From the viewpoint of further enhancing the effects, the content may more preferably be 0.1 to 30 mass %.

The solvent of the hydrophilization treatment agent is not particularly limited and may preferably be the aqueous solvent containing water as a main component from the viewpoints of a waste liquid treatment and the like. Also, from the viewpoints of capability of forming a more uniform and smooth film by improving the film formation property, an organic solvent may be used in combination. The organic solvent is not particularly limited insofar as the organic solvent is typically used for a coating material and is mixed homogeneously with water, and examples thereof include alcohol-based, ketone-based, ester-based, and ether-based organic solvents. A content of the organic solvent may preferably be 0.01 to 5 mass % in the hydrophilization treatment agent.

From the viewpoint of improving stability, the hydrophilization treatment agent of the present embodiment may also contain a pH adjuster. Examples of the pH adjuster include a general acid and alkali such as sulfuric acid, nitric acid, and ammonium.

A solid content concentration of the hydrophilization treatment agent of the present embodiment may preferably be 1 to 11 mass %, more preferably 2 to 5 mass %, from the viewpoints of workability, uniformity and a thickness of the hydrophilic film to be formed, economy, and the like.

In the hydrophilization treatment step (b) of the present embodiment, the NB heat exchanger subjected to the chemical conversion treatment in the chemical conversion treatment step (a) may preferably be subjected to water-washing treatment by a conventional method in advance of the hydrophilization treatment.

Examples of a method for bringing the hydrophilization treatment agent having the above-described configuration to the NB heat exchanger in which the chemical conversion film is formed on the surface include a dipping method, a spraying method, a coating method, and the like. Among these, the dipping method is preferred in view of the complicated structure of the NB heat exchanger. In general, a dipping time may preferably be about 10 seconds at a room temperature. After the dipping, it is possible to control a hydrophilic film coating amount by adjusting a wet film coating amount by air-blowing.

[(c) Baking Step]

The baking step (c) of the present embodiment is the step for forming the hydrophilic film on the surface of the NB heat exchanger by subjecting the NB heat exchanger which underwent the hydrophilization treatment in the above-described hydrophilization treatment step (b) to a baking treatment.

A baking temperature may preferably be the one at which a temperature of the NB heat exchanger per se becomes 140° C. to 160° C., and a baking time may preferably be 2 to 120 minutes. With the baking temperature and time, the hydrophilic film is formed reliably.

A coating amount of the hydrophilic film formed by the baking step (c) of the present embodiment may preferably be 0.05 to 5 g/m². When the coating amount of the hydrophilic film is within the above-specified range, the excellent corrosion resistance and moisture resistance are obtained, and, at the same time, the excellent water resistance and deodorizing property are obtained. It is possible to calculate the coating amount of the hydrophilic film by using a conversion coefficient calculated from a relationship between a hydrophilic film coating amount of a standard film sample and an organic carbon amount contained therein and from a measurement result obtained by a TOC device "TOC-VCS" (Shimadzu Corporation).

The present invention is not limited to the above-described embodiment, and alterations, modifications, and the like within the range capable of attaining the object of the present invention are included in the present invention.

EXAMPLES

The present invention will hereinafter be described in more details based on examples, but the present invention is not limited to the examples. Unless otherwise noted, each of "part", "%", and "ppm" is on a mass basis.

Examples 1 to 23 and Comparative Examples 1 to 6

[Preparation of Chemical Conversion Treatment Agent]

Each of chemical conversion treatment agents was prepared in accordance with a conventional preparation method by incorporating and mixing zirconium, titanium, and vanadium in such a manner that contents of the components and a pH are as shown in Table 1 and Table 2. Fluorozirconic acid was used as the zirconium source, fluorotitanic acid was used as the titanium source, and vanadyl sulfate was used as the vanadium source.

[Preparation of Hydrophilization Treatment Agent]

Each of hydrophilization treatment agents was prepared in accordance with a conventional preparation method by incorporating and mixing the guanidine compound represented by the above general formula (1), the phosphorus compound, the lithium ion, and the additives in such a manner that contents of the components are as shown in Table 1 and Table 2.

[Production of Sample Heat Exchanger]

As heat exchangers, an aluminum heat exchanger (NB heat exchanger) for automotive air conditioner which was flux-brazed with $KAlF_4$ and $K_3AlF_6$ was used. A flux amount on a surface of a fin of each of the heat exchangers was 50 mg/m² in terms of K. Each of the heat exchangers was subjected to pickling by dipping it into an acid bath containing 1% of sulfuric acid and 0.4% of a flux of $KAlF_4$ and $K_3AlF_6$ at 40° C. for 20 seconds.

After the pickling, the chemical conversion treatment was performed by dipping the heat exchanger into the chemical conversion treatment agent prepared as described above at 50° C. for 60 seconds.

After the chemical conversion treatment, the heat exchanger was washed with water for 30 seconds and then was dipped into the hydrophilization treatment agent prepared as described above at a room temperature for 10 seconds. After the dipping, a wet coating film amount was adjusted by air-blowing.

Next, a baking treatment was performed in a drying furnace for 5 minutes at a baking temperature by which a temperature of the heat exchangers per se became 150° C. to produce sample heat exchangers.

Evaluation

Physical properties of the heat exchangers produced by Examples and Comparative Examples were evaluated as follows.

[Corrosion Resistance (White Rust Resistance)]

The sample heat exchangers produced by Examples and Comparative Examples were subjected to the evaluation of corrosion resistance (white rust resistance) based on JIS Z 2371. More specifically, a 5% saline solution at 35° C. was sprayed onto each of the sample heat exchangers produced by each of Examples and Comparative Examples, and an area of a portion where white rust generated after 2,000 hours was evaluated by visual observation in accordance with the following evaluation criteria.

(Evaluation Criteria)
10: No white rust generation.
9: White rust was observed, but the area of the white rust generation was less than 10%.
8: The area of the white rust generation was 10% or more and less than 20%.
7: The area of the white rust generation was 20% or more and less than 30%.
6: The area of the white rust generation was 30% or more and less than 40%.
5: The area of the white rust generation was 40% or more and less than 50%.
4: The area of the white rust generation was 50% or more and less than 60%.
3: The area of the white rust generation was 60% or more and less than 70%.
2: The area of the white rust generation was 70% or more and less than 80%.
1: The area of the white rust generation was 80% or more and less than 90%.

[Moisture Resistance (Blackening Resistance)]

The sample heat exchangers produced by Examples and Comparative Examples underwent a moisture resistance test for 2,000 hours under an atmosphere of a temperature of 70° C. and moisture of 98% or more. An area of a portion where the blackening generated after the test was evaluated by visual observation in accordance with the above-described corrosion resistance evaluation criteria. Since the blackening has the property of ultimately changing into white rust, the area of white rust generation was added to the area of blackening generation.

[Hydrophilicity]

Each of the sample heat exchangers produced by each of Examples and Comparative Examples was brought into contact with running water for 72 hours, and then a contact angle with a water droplet was measured. The measurement of the contact angle was performed by using "CA-Z", an automatic contact angle meter (Kyowa Interface Science Co., Ltd.). The smaller the contact angle, the higher hydrophilicity is achieved. Therefore, it was evaluated that the hydrophilicity was favorable when the contact angle was 40° or less.

[Odor]

Each of the sample heat exchangers produced by each of Examples and Comparative Examples was brought into contact with running water for 72 hours, and then an odor thereof was evaluated in accordance with the evaluation criteria described below. It was evaluated that the deodorizing property was favorable when the odor was 1.5 or less.

(Evaluation Criteria)
0: No odor.
1: Slight odor was perceived.
2: Odor was perceived instantly.
3: Odor was perceived clearly.
4: Strong odor was perceived.
5: Very strong odor was perceived.

[Coating Amount]

The zirconium amount, the titanium amount, and the vanadium amount in the chemical conversion film formed on the surface of each of the sample heat exchangers produced by Examples and Comparative Examples were calculated from results of measurements conducted by attaching fins such that the size thereof is 10 mm×10 mm or more and using a fluorescent X-ray analysis device "XRF-1700" (Shimadzu Corporation).

A coating amount of each of the hydrophilic film formed on the surface of each of the sample heat exchangers produced by Examples and Comparative Examples were calculated by using a conversion coefficient calculated from a relationship between a hydrophilic film coating amount of a standard film sample and an organic carbon amount contained therein and from a measurement result obtained by a TOC device "TOC-VCS" (Shimadzu Corporation).

The compositions of the chemical conversion treatment agents and the hydrophilization treatment agents prepared in Examples and Comparative Examples; and the evaluation results of the sample heat exchangers produced by Examples and Comparative Examples are shown in Table 1 and Table 2.

TABLE 1

| | | | | Example | | | | | | | |
|---|---|---|---|---|---|---|---|---|---|---|---|
| | | | | 1 | 2 | 3 | 4 | 5 | 6 | 7 | 8 |
| Chemical conversion treatment agent | | Zr | Concentration: ppm | 30 | — | 5 | 3000 | — | 1000 | 2000 | 1000 |
| | | Ti | Concentration: ppm | — | 10 | 5 | — | 500 | 150 | 500 | 10 |
| | | V | Concentration: ppm | 100 | 100 | 100 | 50 | 10 | 500 | 500 | 300 |
| | | | pH | 3.5 | 3.5 | 3.5 | 3.5 | 3.5 | 3.5 | 3.5 | 3.5 |
| Hydrophilization treatment agent | Hydrophilic resin | Polyvinyl alcohol | Solid content % | 50 | 50 | 50 | 50 | 50 | 50 | 50 | 50 |
| | | Ethylene oxide-modified polyvinyl alcohol | Solid content % | 20 | 20 | 20 | 20 | 20 | 20 | 20 | 20 |
| | | Carboxymethyl cellulose | Solid content % | — | — | — | — | — | — | — | — |
| | | Sodium polyvinylsulfonate | Solid content % | — | — | — | — | — | — | — | — |
| | | Polyacrylic acid | Solid content % | — | — | — | — | — | — | — | — |

TABLE 1-continued

| | | | | | | | | | | |
|---|---|---|---|---|---|---|---|---|---|---|
| Guanidine compound | 1-O-tolyl biguanide | Solid content % | — | — | — | — | — | — | — | — |
| | Polyhexamethylene biguanide | Solid content % | 10 | 10 | 10 | 10 | 10 | 10 | 10 | 10 |
| Phosphorus-based compound | Phosphoric acid | Solid content % | — | — | — | — | — | — | — | — |
| | Condensed phosphoric acid | Solid content % | — | — | — | — | — | — | — | — |
| | Phytic acid | Solid content % | — | — | — | — | — | — | — | — |
| | PBTC | Solid content % | — | — | — | — | — | — | — | — |
| Lithium | Lithium hydroxide | Solid content % | — | — | — | — | — | — | — | — |
| Additive | Silica | Solid content % | 20 | 20 | 20 | 20 | 20 | 20 | 20 | 20 |
| | Phenol resin | Solid content % | — | — | — | — | — | — | — | — |
| Coating amount | Chemical conversion film | Zr | mg/m² | 11 | — | 5 | 82 | — | 59 | 73 | 39 |
| | | Ti | mg/m² | — | 12 | 11 | — | 103 | 41 | 105 | 9 |
| | | V | mg/m² | 12 | 20 | 16 | 9 | 12 | 50 | 52 | 18 |
| | Hydrophilic film | | g/m² | 0.2 | 0.2 | 0.2 | 0.2 | 0.2 | 0.2 | 0.2 | 0.2 |
| Evaluation results | Corrosion resistance (2000 h) | | | 7.0 | 7.5 | 8.5 | 8.0 | 8.5 | 9.5 | 9.5 | 9.0 |
| | Moisture resistance (70° C. 98% RH 2000 h) | | | 7.5 | 7.0 | 7.5 | 7.0 | 7.0 | 8.0 | 7.0 | 9.5 |
| | Hydrophilicity | | | 20 | 20 | 20 | 20 | 20 | 20 | 20 | 20 |
| | Odor | | | 1.0 | 1.0 | 1.0 | 1.0 | 1.0 | 1.0 | 1.0 | 1.0 |

| | | | | Example | | | | | | | | |
|---|---|---|---|---|---|---|---|---|---|---|---|---|
| | | | | 9 | 10 | 11 | 12 | 13 | 14 | 15 | 16 | 17 |
| Chemical conversion treatment agent | | Zr | Concentration: ppm | 100 | 100 | 100 | 500 | 500 | 500 | 500 | 500 | 500 |
| | | Ti | Concentration: ppm | 50 | 50 | 50 | 50 | 50 | 50 | 50 | 50 | 50 |
| | | V | Concentration: ppm | 100 | 100 | 100 | 100 | 100 | 100 | 100 | 100 | 100 |
| | | | pH | 3.5 | 3.5 | 3.5 | 3.5 | 3 | 3.5 | 4 | 3.5 | 3.5 |
| Hydrophilization treatment agent | Hydrophilic resin | Polyvinyl alcohol | Solid content % | 50 | 50 | 50 | 50 | 40 | 40 | 40 | 45 | 45 |
| | | Ethylene oxide-modified polyvinyl alcohol | Solid content % | 20 | 20 | 20 | 20 | 20 | 20 | 20 | 20 | 20 |
| | | Carboxymethyl cellulose | Solid content % | — | — | — | — | — | — | — | — | — |
| | | Sodium polyvinylsulfonate | Solid content % | — | — | — | — | — | — | — | — | — |
| | | Polyacrylic acid | Solid content % | — | — | — | — | — | — | — | — | — |
| | Guanidine compound | 1-O-tolyl biguanide | Solid content % | — | — | — | — | — | — | — | — | — |
| | | Polyhexamethylene biguanide | Solid content % | 10 | 10 | 10 | 10 | 20 | 20 | 20 | 10 | 10 |
| | Phosphorus-based compound | Phosphoric acid | Solid content % | — | — | — | — | — | — | — | 5 | — |
| | | Condensed phosphoric acid | Solid content % | — | — | — | — | — | — | — | — | 5 |
| | | Phytic acid | Solid content % | — | — | — | — | — | — | — | — | — |
| | | PBTC | Solid content % | — | — | — | — | — | — | — | — | — |
| | Lithium | Lithium hydroxide | Solid content % | — | — | — | — | — | — | — | — | — |
| | Additive | Silica | Solid content % | 20 | 20 | 20 | 20 | 20 | 20 | 20 | 20 | 20 |
| | | Phenol resin | Solid content % | — | — | — | — | — | — | — | — | — |
| Coating amount | Chemical conversion film | Zr | mg/m² | 13 | 11 | 14 | 33 | 35 | 32 | 30 | 33 | 31 |
| | | Ti | mg/m² | 28 | 25 | 30 | 26 | 29 | 27 | 23 | 27 | 26 |
| | | V | mg/m² | 24 | 22 | 26 | 24 | 26 | 25 | 20 | 24 | 23 |
| | Hydrophilic film | | g/m² | 0.1 | 0.2 | 2 | 0.2 | 0.2 | 0.2 | 0.2 | 0.2 | 0.2 |
| Evaluation results | Corrosion resistance (2000 h) | | | 9.0 | 9.0 | 9.0 | 9.0 | 9.5 | 9.5 | 8.5 | 9.5 | 9.5 |
| | Moisture resistance (70° C. 98% RH 2000 h) | | | 8.0 | 8.5 | 9.0 | 8.5 | 8.5 | 9.0 | 9.0 | 9.0 | 9.0 |
| | Hydrophilicity | | | 20 | 20 | 20 | 20 | 22 | 22 | 22 | 20 | 20 |
| | Odor | | | 1.0 | 1.0 | 1.0 | 1.0 | 1.5 | 1.5 | 1.5 | 1.0 | 1.0 |

| | | | | Example | | | | | |
|---|---|---|---|---|---|---|---|---|---|
| | | | | 18 | 19 | 20 | 21 | 22 | 23 |
| Chemical conversion treatment agent | | Zr | Concentration: ppm | 500 | 500 | 500 | 500 | 500 | 500 |
| | | Ti | Concentration: ppm | 50 | 50 | 50 | 50 | 50 | 50 |
| | | V | Concentration: ppm | 100 | 100 | 100 | 100 | 100 | 100 |
| | | | pH | 3.5 | 3.5 | 3.5 | 3.5 | 3.5 | 3.5 |
| Hydrophilization treatment agent | Hydrophilic resin | Polyvinyl alcohol | Solid content % | 45 | 45 | 49 | — | 50 | 40 |
| | | Ethylene oxide-modified polyvinyl alcohol | Solid content % | 20 | 20 | 20 | — | — | 20 |
| | | Carboxymethyl cellulose | Solid content % | — | — | — | 60 | — | — |
| | | Sodium polyvinylsulfonate | Solid content % | — | — | — | — | 25 | — |
| | | Polyacrylic acid | Solid content % | — | — | — | 30 | — | 10 |
| | Guanidine compound | 1-O-tolyl biguanide | Solid content % | — | — | — | 5 | — | 10 |
| | | Polyhexamethylene biguanide | Solid content % | 10 | 10 | 10 | — | 10 | — |
| | Phosphorus-based compound | Phosphoric acid | Solid content % | — | — | — | — | — | — |
| | | Condensed phosphoric acid | Solid content % | — | — | — | — | — | — |
| | | Phytic acid | Solid content % | 5 | — | — | — | — | — |
| | | PBTC | Solid content % | — | 5 | — | — | — | — |
| | Lithium | Lithium hydroxide | Solid content % | — | — | 1 | — | — | — |
| | Additive | Silica | Solid content % | 20 | 20 | 20 | — | 20 | 20 |
| | | Phenol resin | Solid content % | — | — | — | 5 | — | — |

TABLE 1-continued

|  |  |  |  |  |  |  |  |  |
|---|---|---|---|---|---|---|---|---|
| Coating amount | Chemical conversion film | Zr | mg/m² | 33 | 32 | 33 | 32 | 31 | 32 |
|  |  | Ti | mg/m² | 25 | 25 | 24 | 25 | 25 | 27 |
|  |  | V | mg/m² | 24 | 25 | 21 | 23 | 24 | 25 |
|  | Hydrophilic film |  | g/m² | 0.2 | 0.2 | 0.2 | 0.2 | 0.2 | 0.2 |
| Evaluation results | Corrosion resistance (2000 h) |  |  | 9.5 | 9.5 | 9.5 | 9.0 | 9.0 | 9.0 |
|  | Moisture resistance (70° C. 98% RH 2000 h) |  |  | 9.0 | 9.0 | 8.5 | 7.5 | 8.0 | 8.5 |
|  | Hydrophilicity |  |  | 20 | 20 | 20 | 22 | 21 | 20 |
|  | Odor |  |  | 1.0 | 1.0 | 1.0 | 1.5 | 1.5 | 1.0 |

TABLE 2

|  |  |  |  | Comparative Example | | | | | |
|---|---|---|---|---|---|---|---|---|---|
|  |  |  |  | 1 | 2 | 3 | 4 | 5 | 6 |
| Chemical conversion treatment agent | | Zr | Concentration: ppm | — | 500 | — | 1000 | 1000 | 500 |
|  |  | Ti | Concentration: ppm | — | — | 200 | 100 | 10 | 50 |
|  |  | V | Concentration: ppm | 100 | — | — | — | 300 | 100 |
|  |  | pH |  | 3.5 | 3.5 | 3.5 | 3.5 | 3.5 | 1.5 |
| Hydrophilization treatment agent | Hydrophilic resin | Polyvinyl alcohol | Solid content % | 50 | 50 | 50 | 50 | 50 | 50 |
|  |  | Ethylene oxide-modified polyvinyl alcohol | Solid content % | 20 | 20 | 20 | 20 | 30 | 20 |
|  |  | Carboxymethyl cellulose | Solid content % | — | — | — | — | — | — |
|  |  | Sodium polyvinylsulfonate | Solid content % | — | — | — | — | — | — |
|  |  | Polyacrylic acid | Solid content % | — | — | — | — | — | — |
|  | Guanidine compound | 1-O-tolyl biguanide | Solid content % | — | — | — | — | — | — |
|  |  | Polyhexamethylene biguanide | Solid content % | 10 | 10 | 10 | 10 | — | 10 |
|  | Phosphorus-based compound | Phosphoric acid | Solid content % | — | — | — | — | — | — |
|  |  | Condensed phosphoric acid | Solid content % | — | — | — | — | — | — |
|  |  | Phytic acid | Solid content % | — | — | — | — | — | — |
|  |  | PBTC | Solid content % | — | — | — | — | — | — |
|  | Lithium | Lithium hydroxide | Solid content % | — | — | — | — | — | — |
|  | Additive | Silica | Solid content % | 20 | 20 | 20 | 20 | 20 | 20 |
|  |  | Phenol resin | Solid content % | — | — | — | — | — | — |
| Coating amount | Chemical conversion film | Zr | mg/m² | — | 39 | — | 55 | 41 | 7 |
|  |  | Ti | mg/m² | — | — | 43 | 38 | 7 | 9 |
|  |  | V | mg/m² | 6 | — | — | — | 20 | 5 |
|  | Hydrophilic film |  | g/m² | 0.2 | 0.2 | 0.2 | 0.2 | 0.2 | 0.2 |
| Evaluation results | Corrosion resistance (2000 h) |  |  | 3.0 | 5.0 | 4.0 | 5.0 | 8.5 | 4.0 |
|  | Moisture resistance (70° C. 98% RH 2000 h) |  |  | 2.0 | 3.0 | 3.0 | 3.0 | 4.0 | 3.0 |
|  | Hydrophilicity |  |  | 20 | 20 | 20 | 20 | 18 | 20 |
|  | Odor |  |  | 1.0 | 1.0 | 1.0 | 1.0 | 0.5 | 1.0 |

Details of the components shown in Table 1 and Table 2 are as follows.

(1) In each of the chemical conversion treatment agents, "Zr concentration" indicates a zirconium content (concentration of various ions in terms of the metal element) in the chemical conversion treatment agent; "Ti concentration" indicates a titanium content (concentration of various ions in terms of the metal element) in the chemical conversion treatment agent, and "V concentration" indicates a vanadium content (concentration of various ions in terms of the metal element) in the chemical conversion treatment agent.

(2) Each of the contents of the components of each of the hydrophilization treatment agents is a value relative to a solid content of the hydrophilization treatment agent.

(3) "PBTC" represents phosphonobutanetricarboxylic acid.

(4) A saponification degree of the polyvinyl alcohol is 99%, and a number average molecular weight thereof is 60,000.

(5) A saponification degree of the ethylene oxide-modified polyvinyl alcohol is 99%, a number average molecular weight thereof is 20,000, and a content ratio of a polyoxyethylene group (a ratio to all of pendant groups in the polyvinyl alcohol) is 3%.

(6) A number average molecular weight of the carboxymethyl cellulose is 10,000.

(7) A number average molecular weight of the sodium polyvinylsulfonate is 20,000.

(8) A number average molecular weight of the polyacrylic acid is 20,000.

(9) Silica is an inorganic crosslinking agent formed of anhydrous silica, and an average diameter of primary particles thereof is 10 nm.

(10) The phenol resin is an organic crosslinking agent formed of a resol type phenol resin, and a number average molecular weight thereof is 300.

(11) The condensed phosphoric acid is tripolyphosphoric acid.

As shown in Table 1 and Table 2, each of Examples 1 to 23 is excellent in corrosion resistance and moisture resistance as compared to Comparative Examples 1 to 6 and has the favorable hydrophilicity and odor (deodorizing property) which are free from inferiority to Comparative Examples 1 to 6. From the results, it was confirmed that the corrosion resistance (white rust resistance) and moisture resistance (blackening resistance) which are more excellent than the conventional examples are obtained by: forming the chemical conversion film by subjecting the NB heat exchanger to the chemical conversion treatment using the chemical conversion treatment agent including at least one of zirconium and titanium of which the content is 5 to 5,000 mass ppm in total and vanadium of which the content is 10 to 1,000 mass ppm and having the pH of 2 to 6; bringing the NB heat exchanger into contact with the hydrophilization treatment agent including the hydrophilic resin and at least one of the guanidine compound represented by the above general formula (1) and the salt thereof; and forming the hydrophilic film by baking.

INDUSTRIAL APPLICABILITY

According to the surface treatment method for aluminum heat exchanger of the present invention, since the excellent corrosion resistance (white rust resistance) and moisture resistance (blackening resistance) are imparted to a heat exchanger in which a flux remains on surfaces of fins and so forth, the surface treatment method is suitably employed for a surface treatment of NB heat exchangers for automotive air conditioners.

The invention claimed is:
1. A surface treatment method for an aluminum heat exchanger which is subjected to flux brazing by employing a Nocolok brazing process, comprising:
  (a) forming a chemical conversion film on a surface of the aluminum heat exchanger by subjecting the aluminum heat exchanger to a chemical conversion treatment using a chemical conversion treatment agent including zirconium, titanium, and having a pH of 2 to 6, wherein an amount of the zirconium relative to the total amount of the chemical conversion treatment agent is 5 to 3,000 mass ppm, an amount of the titanium relative to the total amount of the chemical conversion treatment agent is 10 to 500 mass ppm, and an amount of the vanadium relative to the total amount of the chemical conversion treatment agent is 10 to 500 mass ppm;
  (b) bringing the aluminum heat exchanger in which the chemical conversion film is formed on the surface thereof into contact with a hydrophilization treatment agent including a hydrophilic resin, at least one of a guanidine compound represented by the following general formula (1) and a salt thereof, and at least one of phosphoric acid and condensed phosphoric acid:

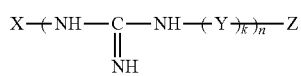
(1)

[in the formula (1), Y represents —C(=NH)—$(CH_2)_m$, —C(=O)—NH—$(CH_2)_m$, or —C(=S)—NH—$(CH_2)_m$—;
m represents an integer of 0 to 20; n represents a positive integer; k represents 0 or 1;
X represents hydrogen, an amino group, a hydroxyl group, a methyl group, a phenyl group, a chlorophenyl group, or a methylphenyl(tolyl) group; and
Z represents hydrogen, an amino group, a hydroxyl group, a methyl group, a phenyl group, a chlorophenyl group, a methylphenyl(tolyl) group, or a polymer represented by the following general formula (2) and having a mass average molecular weight of 200 to 1,000,000]:

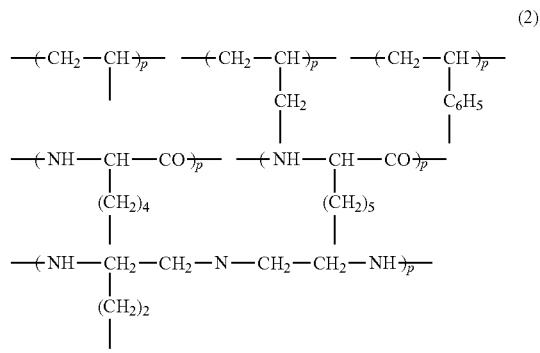
(2)

[in the formula (2), p represents a positive integer]; and
  (c) forming a hydrophilic film on the surface of the aluminum heat exchanger by subjecting the aluminum heat exchanger which is subjected to the contact treatment to a baking treatment.

2. The aluminum heat exchanger surface treatment method according to claim 1, wherein
the guanidine compound and the salt thereof are a guanidine compound having a biguanide structure represented by the following general formula (4) and a salt thereof:

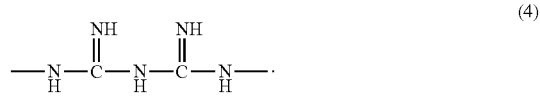
(4)

3. The aluminum heat exchanger surface treatment method according to claim 1, wherein
a sum of an amount of zirconium and an amount of titanium is 5 to 300 mg/m² and an amount of vanadium is 1 to 150 mg/m² in the chemical conversion film formed in the step (a); and
a coating amount of the hydrophilic film is 0.05 to 5 g/m².

4. The aluminum heat exchanger surface treatment method according to claim 1, wherein
the hydrophilic resin in the hydrophilization treatment agent comprises at least one of polyvinyl alcohol and modified polyvinyl alcohol each having a saponification degree of 90% or more.

5. The aluminum heat exchanger surface treatment method according to claim 2, wherein
a sum of an amount of zirconium and an amount of titanium is 5 to 300 mg/m² and an amount of vanadium is 1 to 150 mg/m² in the chemical conversion film formed in the step (a); and
a coating amount of the hydrophilic film is 0.05 to 5 g/m².

6. The aluminum heat exchanger surface treatment method according to claim 1, wherein
the hydrophilic resin in the hydrophilization treatment agent comprises at least one of polyvinyl alcohol and modified polyvinyl alcohol each having a saponification degree of 90% or more.

7. The aluminum heat exchanger surface treatment method according to claim 2, wherein
the hydrophilic resin in the hydrophilization treatment agent comprises at least one of polyvinyl alcohol and modified polyvinyl alcohol each having a saponification degree of 90% or more.

8. The aluminum heat exchanger surface treatment method according to claim 3, wherein
the hydrophilic resin in the hydrophilization treatment agent comprises at least one of polyvinyl alcohol and modified polyvinyl alcohol each having a saponification degree of 90% or more.

* * * * *